UNITED STATES PATENT OFFICE.

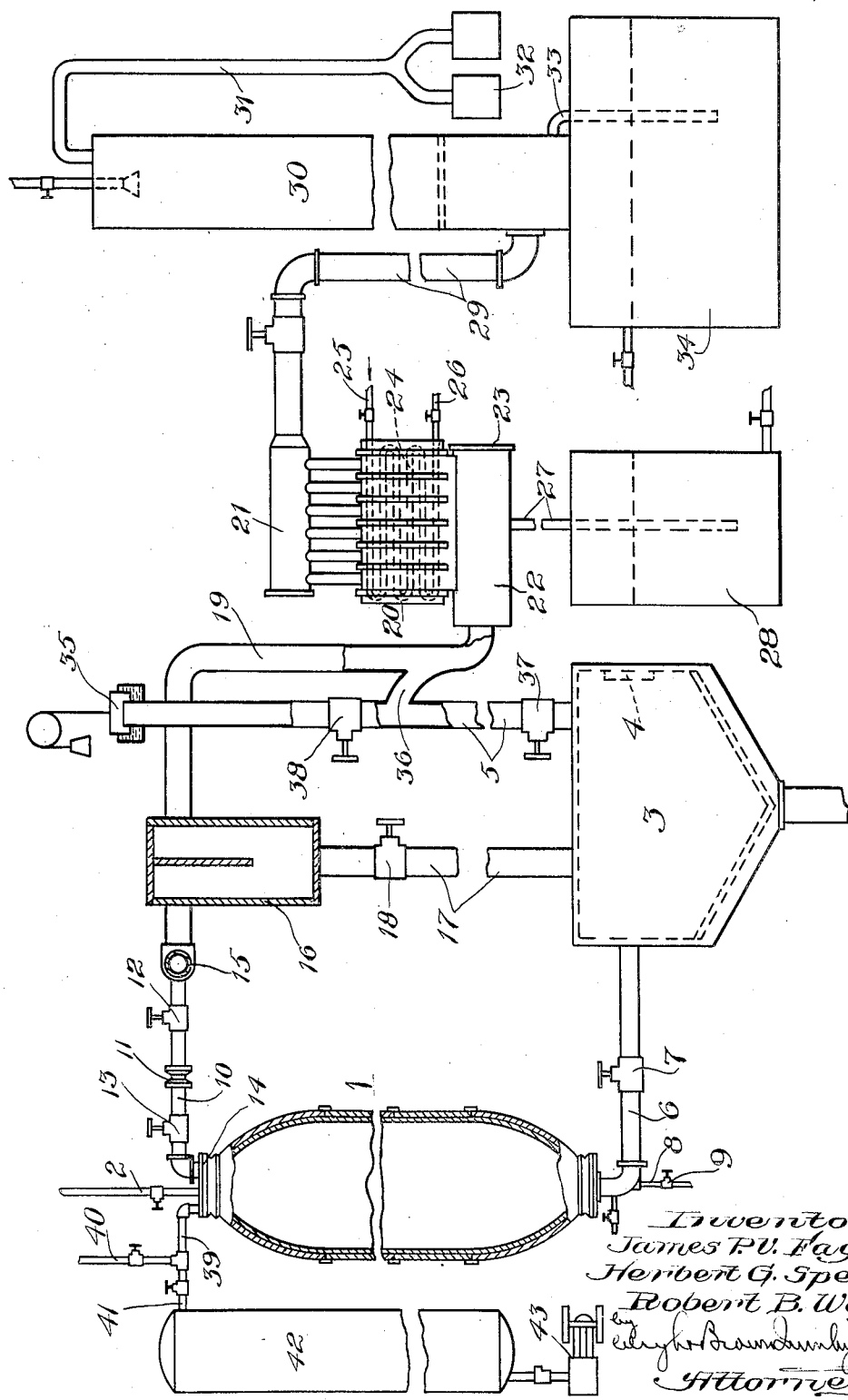

JAMES P. V. FAGAN, HERBERT G. SPEAR, AND ROBERT B. WOLF, OF BERLIN, NEW HAMPSHIRE; SAID FAGAN AND SAID SPEAR ASSIGNORS OF THEIR RIGHT TO BROWN COMPANY, OF BERLIN, NEW HAMPSHIRE, A CORPORATION OF MAINE.

PROCESS OF MANUFACTURING SULFITE FIBER AND RECOVERING SULFUR DIOXID.

1,327,666.      Specification of Letters Patent.   Patented Jan. 13, 1920.

Application filed April 30, 1918. Serial No. 231,622.

*To all whom it may concern:*

Be it known that we, JAMES P. V. FAGAN, HERBERT G. SPEAR, and ROBERT B. WOLF, citizens of the United States, residing at Berlin, in the county of Coos and State of New Hampshire, have invented new and useful Improvements in Processes of Manufacturing Sulfite Fiber and Recovering Sulfur Dioxid, of which the following is a specification.

This invention has for its object the recovery of sulfur dioxid in connection with the digestion of wood in the manufacture of sulfite fiber.

The invention consists in liberating from the upper portion of the digester the gases and steam which are ordinarily liberated in the blow pit, and by condensation eliminating the water and other condensable gases, and finally separating from the remaining inert gases, e. g. nitrogen, oxygen and carbon dioxid, and recovering substantially pure sulfur dioxid.

It is customary in the usual practice of cooking the chips in a calcium bisulfite solution containing free sulfurous acid, occasionally or from time to time to relieve the digester of the air and gas at the top thereof through a small screened relief pipe, and, after the cook is completed, to blow the contents of the digester into a blow pit, and to permit the steam and gases constituting a part of such contents to escape into the atmosphere through the vomit stack leading from the blow pit.

According to our present invention, we employ, in addition to the usual relief system, a relatively large and preferably unobstructed or unscreened conduit which carries the vapor and gases (which usually are liberated in the blow pit) from the upper part of the digester to a condenser during the completion of the cooking operation, or, if so desired, during the whole cooking period. These vapors and gases, having a boiling point at 212° F. and above, are condensed, and the remaining gases are then treated to recover the sulfur dioxid in any suitable way, as for example by conducting them through a lime tower wherein the sulfur dioxid is recovered in the form of calcium bisulfite. Preferably there is interposed between the condenser and the digester a settling or collector chamber in which any pulp and liquor escaping through the conduit is caught and collected. This we find to be desirable, as the conduit must be relatively unobstructed, and consequently, as previously indicated, no screen is employed therein as in the usual relief pipe leading from the top of the digester. After the valve of the gas blow pipe or conduit leading from the top or upper portion of the digester has been opened, and while it is yet only cracked, we preferably inject sufficient steam into the digester from below to cause an ebullition of the mass and to insure the escape of most of the sulfur dioxid gas that may be left therein, during which time, even though gases and steam are escaping through the cracked valve, the pressure continues to increase until there is sufficient pressure to blow the digester, since the steam is admitted faster at the bottom than it is relieved at the top. During all this period, the completion of the cooking operation may proceed, and consequently the recovery of the sulfur dioxid may be accomplished during such period. The final injection of steam as thus described may be therefore a part of the cooking operation and not a step following the completion thereof, since the injection of steam at a pressure necessary to blow the digester after the cooking is finished might cause an overcooking of the material; but, instead of employing steam for blowing the contents of the digester, we may employ air drawn from a storage tank in which it is compressed.

Referring now to the accompanying drawing, which illustrates conventionally an apparatus embodying the invention and by means of which our process may be practised,—1 illustrates a digester from the top of which leads a small screened and valved pipe 2 for permitting the usual relief during the cooking. 3 indicates a blow pit having a target 4 and vomit stack 5 and provided with the usual false bottom (indicated by dotted lines) for draining the liquor from the pulp. The conduit 6, provided with a valve 7, leads from the bottom of the digester to the blow pit. 8 indicates a steam pipe having a valve 9, for injecting steam under pressure into the digester for cooking the wood chips under the pressure and at the temperature desired. As thus far explained, the apparatus is like that ordinarily employed.

Our system comprises a pipe 10 leading from the upper portion of the digester, above the level of the contents thereof. This pipe is preferably from six to ten inches in diameter, and is provided with a coupling 11, a valve 12, and a second or supplemental valve 13, said valves being on both sides of the coupling. This construction is desirable when the pipe is connected to the removable top 14 of the digester as illustrated. The pipe 10 is connected to a main 15 of larger diameter, to which other similar pipes leading from other digesters may communicate. 16 indicates a relatively large collector or settling chamber. The function of this chamber is to collect the pulp and liquor, which settle in the lower portion, and which may be discharged therefrom by an outlet 17 having a valve 18, into the blow pit 3. If desired, the pulp and liquor may be delivered by the outlet pipe to the blow pit or to a storage tank (not shown). The settling and collecting chamber is connected by a conduit 19 with a surface condenser indicated as a whole at 20, the sections of which are connected with an upper manifold 21 and with a lower manifold 22 which forms a drip and settling chamber. Said chamber 22 has an end 23 which is removable for cleaning purposes. The coils 24 for the cooling medium are conventionally shown by dotted lines, the inlet and outlet being indicated respectively at 25 and 26. Water at seasonable temperatures is employed as the cooling medium, and is caused to flow from the top to the bottom so as not to cool the water of condensation to such an extent as to absorb any appreciable quantity of gases. This water of condensation is discharged from the condenser into the collecting chamber 22 and flows therefrom through drip pipe 27 to the tank 28. The manifold 21 is connected by a pipe 29 to any suitable apparatus for absorbing or otherwise recovering sulfur dioxid. A lime tower 30 is illustrated for the purpose referred to, and a pipe 31 leads from the top thereof to a vacuum pump 32. The discharge pipe 33 from lime tower 30 leads to the acid storage tank, 34.

At the top of the vomit stack 5 there is a movable luted cover 35 which may be opened to permit the escape of vapors and gases to the atmosphere, but said stack is connected by a by-pass 36 to the conduit 19, and is also provided with the valves 37, 38, for cutting off the flow of vapor through the stack entirely, or for causing its diversion through the condenser, if desired. When both valves are open, the vapors pass directly to the atmosphere, the cover being lifted for this purpose.

For supplying steam or air to the top of the digester, there is a conduit 39 having one branch 40 leading from a high pressure steam main (not shown) and another, 41, leading from an air tank 42 in which air may be compressed and stored by a compressor 43.

In practice, the digester is supplied with the usual quantity of chips and the sulfite liquor containing more or less free sulfurous acid. Steam is injected from time to time through the valved inlet 9 to cook the mass at the desired temperature under the desired pressure, and from time to time the valve of the relief pipe 2 is opened to permit the escape of air and some of the gases, in accordance with the usual practice. When the cooking process has so far progressed that the remaining operation to be described will complete it, the pump 32 is set in operation to create a vacuum in the tower which is exerted through the system back to the digester, and the valves 12 and 13 are opened. At this time the valves 18, 37, 38 are closed. The gases and vapors, with more or less liquor and pulp, blow through the pipe 10 and main 15 to the settling chamber 16, until finally there is a reduced pressure or partial vacuum in the digester. The vapors, in passing through the condenser 20, together with the gases which condense at a temperature slightly below 212° F., are condensed and drop into the tank 28, and are there collected with the small amount of liquor and pulp which passed over from the digester. The sulfur dioxid, and the other gases, consisting mainly of nitrogen and carbon dioxid, are drawn from the condenser by the pump 32 into the tower or absorbing system 30 where the sulfur dioxid is absorbed and recovered—in this case in the form of calcium bisulfite.

During the completion of the cooking, the valve 13 is partially closed, or "cracked," and steam is injected again into the digester to cause the circulation of the contents of the lower part of the digester (which owing to the static head of the liquor above it will not liberate gas easily) to the top thereof to insure the liberation and discharge of any remaining sulfur dioxid, and to prevent the digester from "packing." When the pressure in the digester is brought to the desired degree, the contents may then be blown in the usual manner into the blow pit against the target, and the liberated steam (which is now free of sulfur dioxid) escapes through the vomit stack.

We consider it desirable to have the cooling medium pass through the condenser in such way that the products of condensation are at a high temperature to prevent the absorption thereby of the sulfur dioxid, and it is for that reason that we carry the coil 24 through the condenser with the lowest portion of the coil at the delivery end, so as not to chill unduly the said condensation products.

It will be understood that we do not wish to confine ourselves to the exact types of instrumentalities herein illustrated and described as capable of use for practising our process or of embodying our invention.

We could, of course, dispense with the separate small relief pipe, and, during the cooking, relieve the digester through the large unobstructed conduit 10 by slightly opening the valves 12 and 13, and we should not regard this elimination of the small relief pipe in such case as a departure from the invention. In order that the gas-and-vapor blowing operation, which completes the cooking operation, should take a relatively short time—say, ten to twenty minutes—the discharge conduit should be unobstructed and should be several times larger than the relief pipes which have heretofore been employed.

Instead of building up the pressure in the digester by the injection of steam through the pipe 9, we may (after blowing sufficient steam into the digester contents while the valve 13 is "cracked") do so by forcing steam through pipes 40, 39, into the top of the digester, or by forcing air thereinto from the tank 42 through pipes 41, 39, especially when the cook has been completed by the time the $SO_2$ gas has all been liberated from the digester.

The process as described is different from that heretofore followed, in which the digester is relieved from time to time through the usual relief system which includes instrumentalities for the recovery of the gas and liquor, because in such case the relief pipe is relatively small in diameter and is screened, and the purpose of the relief is to permit the escape of air and only enough steam to permit the injection of live steam into the lower end of the digester to maintain the contents at the proper cooking temperature, and because the subsequent blowing of the digester causes the liberation and wastage through the blow pit and the vomit stack of vast quantities of sulfur dioxid into the surrounding atmosphere. According to the present invention, on the other hand, the discharge of practically all the gases and the recovery of the sulfur dioxid are effected prior to the blowing of the digested material into the blow pit. This is practically assured by causing a vacuum in the recovery system.

It is quite evident that the recovery system may be practically in continuous operation when it constitutes a part of a large installation comprising a number of digesters, piped to connect with the main 15, or the system may be connected to only a small number of digesters. A system such as herein described possesses numerous advantages which will be appreciated by those skilled in the art, among which may be briefly mentioned;—

First, the ease of its installation and its low cost of construction and maintenance;

Second, the possibility of recovering almost the last trace of sulfur dioxid from the cooking liquor during the cooking operation without loss of production or material; and Third, an increased yield per day from the digesters, due to the rapid gas recovery during the cooking process.

To one familiar with the manufacture of sulfite fiber, other manifest advantages of the process and apparatus hereinbefore described will be apparent. It may not be amiss, however, to point out that we are thereby enabled to obtain a practically pure sulfur dioxid, as substantially all air leaks, which are necessarily present in a large system of piping, are practically eliminated. Furthermore, inasmuch as the digester is air-tight and it is very difficult to prevent the access of air to and its accumulation in the blow pit, by passing the vapors directly from the digester to the recovery system and not through the blow pit, we eliminate the further danger of air being drawn into the recovery system. By eliminating the danger of air being drawn into the recovery system, we prevent the formation of calcium sulfate in the lime tower and obtain an acid rich in $SO_2$. Another advantage, due to the process and apparatus, is that we may employ a relatively small surface condenser, since a longer time may be taken for blowing off the vapors and gas than where the entire contents of the digester are blown into the blow pit. Further, we save wear and tear on the blow pits, since the gas is largely prevented from reaching them.

A further advantage of this process is that it permits the contents of a digester to be held, without overcooking. It frequently happens in a mill that the cooking in a given digester progresses to a point where it is necessary to blow the contents into the blow pit, but, because the pit has not been emptied from the material resulting from a previous blow, it is advisable or desirable to delay the blowing of the digester. This could not be done under ordinary conditions as the material would be spoiled by overcooking. But according to our process and system, the digester may be blown free of gas and steam and the temperature of the contents reduced to a point where no cooking takes place, and the digester held until the blow pit is free to be used. The contents of the digester, though hot, are still incompletely cooked, and may be held in the digester for a reasonable length of time, until the steam is again injected to bring the pressure to a blowing point, thus completing the cook, all without any deterioration of the fiber; or else, if the cooking has been completed, air may be used to build up the pressure sufficiently to blow the chips and liquor into the blow pit.

One may, if desired, permit the vapors and gases to pass from the blow pit through the condenser by closing valve 38 and opening valve 37, in case it should for any cause be necessary to discharge the digester into the blow pit before discharging the vapors and gases as hereinbefore described through conduit 10, but this would be only in case of emergency, for ordinarily there would be practically no free sulfur dioxid liberated with the vapors in the blow pit after the vapors and gases are blown through the conduit 10.

Having thus explained the nature of our said invention, and described a way of making and using the same, although without attempting to set forth all of the forms in which it may be made or all of the modes of its use, what we claim is:—

1. The herein described process of recovering sulfur dioxid and in the manufacture of sulfite pulp, which consists in blowing into a condenser from the top of the digester, at or during the last portion of the cooking operation, those vapors and gases which are usually blown with the digester contents into the blow pit, and separating and recovering sulfur dioxid from such vapors and gases.

2. The herein described process, which consists in cooking chips under heat and pressure in acid liquor in a digester, before the cooking operation is completed blowing from the top of the digester those vapors and gases which are usually blown with the digester contents into the blow pit, condensing the vapors, and separating and recovering sulfur dioxid from the remaining gases.

3. The herein described process which consists in partially cooking the raw material and then completing the cooking operation while discharging from the top of the digester those gases and vapors which are usually blown into the blow pit with the digester contents, increasing the pressure in the digester, then blowing the digester contents into the blow pit, and separating and recovering sulfur dioxid from the said vapors and gases.

4. The herein described process, which consists in partially cooking the raw material, and then, during the completion of the cooking operation, discharging the gases and vapors from the top of the digester into a recovery system wherein the contained sulfur dioxid is separated and recovered and at the same time injecting steam into the lower portion of the digester to insure the discharge of the sulfur dioxid and the completion of the cook, and finally blowing the digester contents practically free of sulfur dioxid into the blow pit.

5. The herein described process which consists in cooking the raw material in the usual manner and relieving the pressure as ordinarily, then, when the cooking is substantially or nearly completed, discharging from the upper portion of the digester into a conduit, in which the pressure is below atmospheric, those gases and vapors which are usually blown with the cooked material into the blow pit, condensing the vapors, and separating and recovering sulfur dioxid from the remaining gases, injecting steam into the digester and partially closing said conduit, and finally, when the pressure is sufficient, blowing the cooked material practically free of sulfur dioxid from the lower end of the digester into a blow pit.

6. The herein described process which consists in cooking the raw material in the sulfite liquor in a digester under conditions of heat and pressure, on partial or substantial completion of the cooking operation discharging all the contained gases and vapors from the upper portion of the digester into a conduit held under reduced pressure, separating therefrom the pulp and liquor carried over therewith, condensing the vapors by surface condensation, separating and recovering the sulfur dioxid from the remaining gases, partially closing said conduit and forcing an elastic fluid into the digester to free the contents thereof of sulfur dioxid and to build up the pressure in the digester, and finally by such pressure blowing the contents of the digester practically free of sulfur dioxid into a blow pit.

7. The herein described process for the manufacture of sulfite fiber, which consists in cooking the raw material in the usual manner, relieving the digester from time to time as ordinarily, and then, when the cooking operation nears completion, blowing the vapors and gas from the upper portion of the digester substantially at or below atmospheric pressure, and recovering the gas, then forcing an elastic medium under pressure into the upper portion of the digester, and forcing the cooked material under pressure from the lower end of the digester.

8. The combination of a digester, a blow pit, a surface condenser, a recovery apparatus for gas connected to the condenser, and a large unobstructed discharge pipe for conducting the vapor and gas, upon completion of the cooking operation, from the upper portion of the digester to said condenser and recovery apparatus for the condensation of the vapor and recovery of the gas.

9. The combination of a digester having a valved discharge pipe leading from the upper end thereof, a blow pit, a conduit leading from the lower end of the digester to the blow pit, a vacuum pump, a surface condenser and a gas-recovering instrumentality interposed between the valved discharge pipe and the pump, in consequence of which, during the completion of the cooking of the raw material, the gases and vapors may be discharged through said pipe, the vapors condensed and the sulfur dioxid recovered.

10. The combination with a digester having the usual valved relief pipe, a blow pit, and a conduit leading from the digester to the blow pit, of a relatively large valved conduit leading from the upper portion of the digester, a settling chamber, a surface condenser, and a gas-recovering instrumentality all connected with the said conduit in the order named.

11. The combination with a digester having the usual valved relief pipe, a blow pit, and a conduit leading from the digester to the blow pit, of a relatively large valved conduit leading from the upper portion of the digester, a settling chamber, a surface condenser, a gas-recovering instrumentality all connected with the said conduit in the order named, and a vacuum pump for creating a vacuum back to the digester in the recovering instrumentality, the condenser and the settling chamber.

12. The combination with a digester having the usual relief pipe for relieving the digester during the cooking operation, of a large size unscreened discharge conduit leading from the upper portion of the digester for the discharge of the gas and the relief liquor in the form of vapor, a surface condenser for condensing the vapors, a pulp and liquid separator in said conduit interposed between the condenser and the digester, a vacuum pump, and a gas recovery apparatus interposed between the pump and the condenser, said parts all being so arranged that, prior to the discharge of the cooked material from the digester, a part of the liquor and its contained gas may be drawn from the digester, the vapors condensed and the gas recovered.

In testimony whereof we have affixed our signatures.

JAMES P. V. FAGAN.
HERBERT G. SPEAR.
ROBERT B. WOLF.